F. H. HALL.
VEHICLE TOP.
APPLICATION FILED MAY 20, 1919.
1,345,174.
Patented June 29, 1920.
2 SHEETS—SHEET 1.
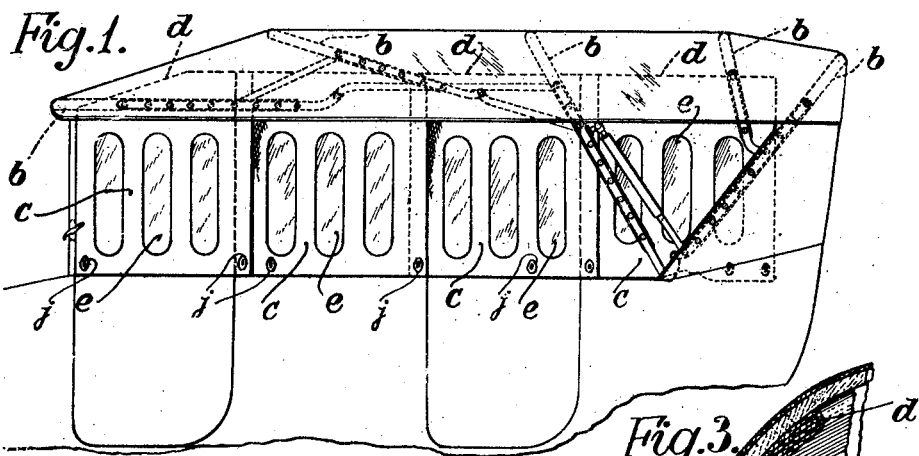
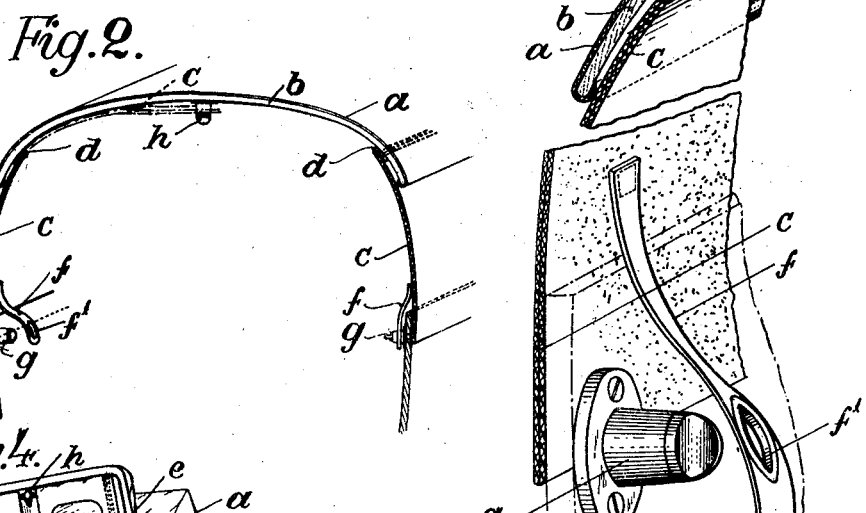
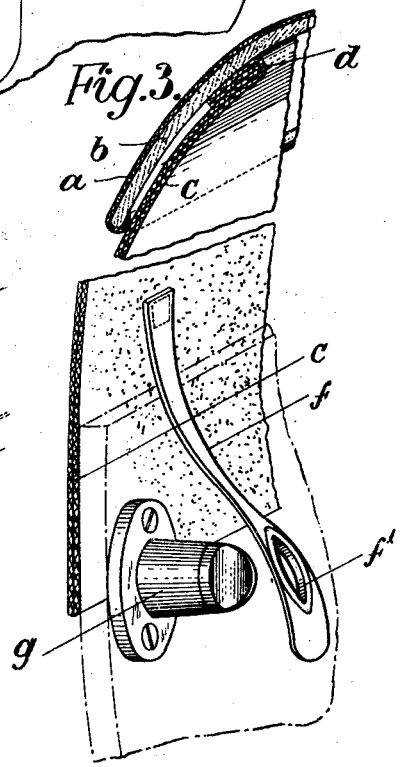
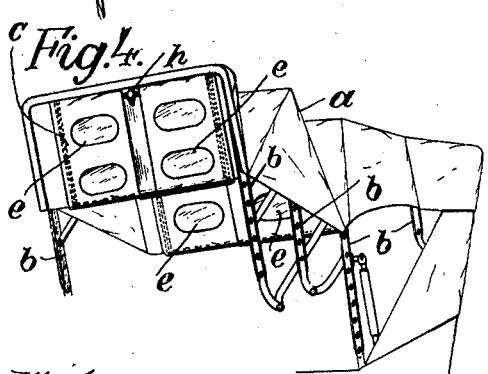
Witnesses:
Inventor
Frederick H. Hall
by
Attorney.

F. H. HALL.
VEHICLE TOP.
APPLICATION FILED MAY 20, 1919.
1,345,174.
Patented June 29, 1920.
2 SHEETS—SHEET 2.
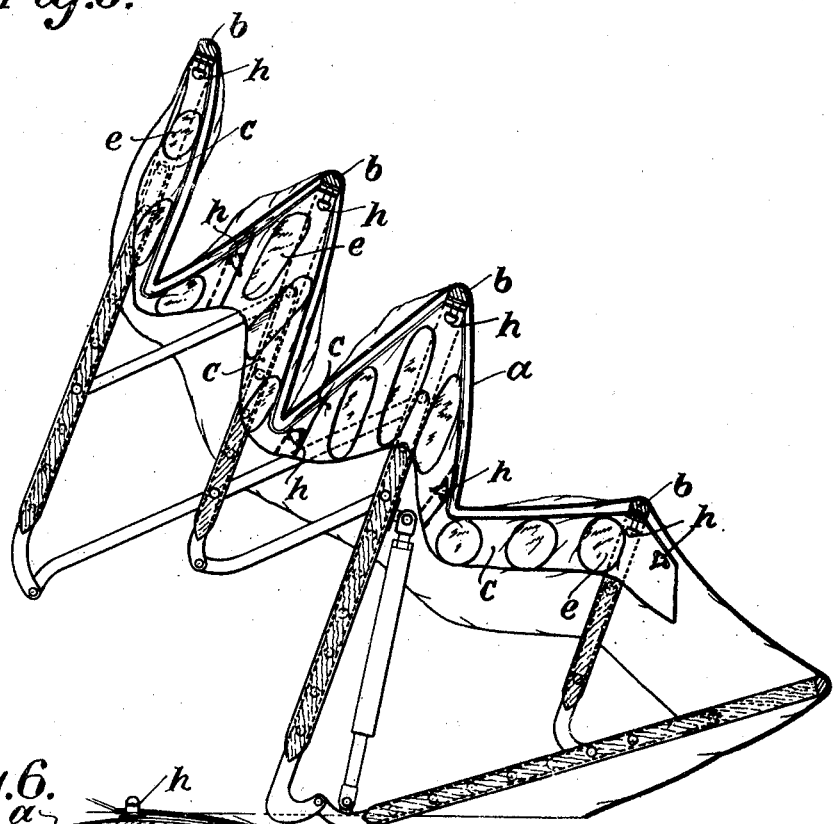
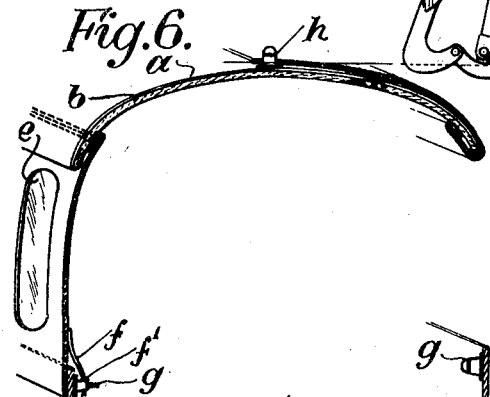
Witnesses:
Norris L. Sumby.
Inventor
Frederick H. Hall
By James L. Norris
Attorney

UNITED STATES PATENT OFFICE.

FREDERICK HAROLD HALL, OF CLAVERDON, ENGLAND.

VEHICLE-TOP.

1,345,174.  Specification of Letters Patent.  Patented June 29, 1920.

Application filed May 20, 1919. Serial No. 298,499.

*To all whom it may concern:*

Be it known that I, FREDERICK HAROLD HALL, subject of the King of Great Britain, residing at Gannaway Gate, Claverdon, county of Warwick, England, have invented certain new and useful Improvements in Vehicle-Tops, of which the following is a specification.

This invention relates to automobiles and other vehicle tops or hoods of that kind adapted to be folded up or collapsed at the rear of the vehicle and provided with side curtains for the protection of the passengers from rain which would otherwise enter the vehicle through the open sides.

Heretofore the side curtains have been arranged to be completely detached from the top or hood when not in use, but according to the present invention they are adapted to be folded against and to be secured to the said top or hood, and to fold up with the latter when collapsed. The curtains can thus be readily turned down into position, when required for use, without disturbing the passengers.

Figure 1 of the accompanying drawings represents a side view of an automobile top having side curtains in accordance with the present invention.

Fig. 2 is a cross-section through the said vehicle top showing, by dotted lines, how the curtains may be secured to the roof when not in use.

Fig. 3 is a section through a portion of the top on a larger scale, showing how the curtains are secured to the vehicle body.

Fig. 4 is a perspective view showing the curtains folded against and secured to the roof and the vehicle top being in the act of being collapsed or folded back.

Fig. 5 is a longitudinal section through the top when being collapsed.

Fig. 6 shows a modification.

Referring to Figs. 1 to 5, the vehicle top or hood $a$ may be of any suitable or usual construction, being carried by pivoted sticks or hoop members $b$ by which it may be collapsed or folded back at the rear of the vehicle in the known manner.

To close the sides of the vehicle a series of hanging curtains $c$ are employed which are secured to the top $a$ (either inside or outside) by their upper edges at $d$. Preferably they are permanently secured by stitching or riveting although they may be attached by any other suitable means, such as by straps, clips, buttons, or by cement; or the curtains may be in one piece with the material of the top. The curtains are made of flexible material, and preferably overlap at their vertical edges, and are provided with celluloid windows $e$. Their lower ends hang over the sides of the body of the vehicle and are secured to the inside of the latter by means of tabs or straps $f$ having eyelets $f^1$ adapted to engage turn-buttons $g$ on the said body.

When the curtains are not required for use, they are adapted to be raised or folded against the underside of the roof of the hood, as shown in Fig. 4 and by dotted lines in Fig. 2, and are secured by turn-buttons $h$ on the top engaging eyelets $j$ in the lower edges of the curtains. Certain of the turn-buttons $h$ are carried by the sticks $b$, as shown, so that when the top is collapsed the curtains fold with it, as shown in Figs. 4 and 5. The edges of opposite curtains may be arranged to overlap and be secured by the same turn-buttons, or they may be secured by separate turn-buttons without overlapping. Also, instead of the said edges being secured to the roof by turn-buttons they may be secured by press-studs or other forms of fasteners.

In the modification represented in Fig. 6, instead of the side curtains $c$ folding under the top $a$, they may be turned over on to the outside of the latter, and secured by fasteners $h$.

The curtains may be stiffened by means of strips or bars of any suitable material so that they will maintain their shape both when in use and when not in use.

The drawing represents the application of the invention to a four-seater automobile, but the application to a top for a two-seater or commercial automobile differs in no essential respect.

In some cases single side curtains may be used at each side, instead of a series of curtains.

Having fully described my invention, what I desire to claim and secure by Letters Patent is:—

1. A folding vehicle top comprising a collapsible roof portion, side curtains secured at their upper ends to the roof portion, and means for detachably securing the lower portions of the curtains against the roof portion with the said curtains in a flat or extended condition, said securing means being placed so that the turned-up curtains can fold with the roof portion in a zig-zag manner, and said side curtains being arranged to be turned up against the roof portion without being detached at their upper ends.

2. A folding vehicle top comprising a collapsible roof portion, sticks carrying said roof portion, side curtains secured at their upper ends to the roof portion, and means carried by the sticks for detachably securing the lower portions of the curtains to the said sticks at longitudinally separated points with the curtains in a flat or extended condition, said side curtains being arranged to be turned up against the roof portion without being detached at their upper ends and being adapted to fold with the roof portion in a zig-zag manner.

In testimony whereof I have hereunto set my hand in presence of two subscribing witnesses.

FREDERICK HAROLD HALL.

Witnesses:
H. N. SKERRETT,
W. S. SKERRETT.